W. F. HITCHCOCK & W. D. HAWLEY.
TIME RECORDER.
APPLICATION FILED OCT. 21, 1907. RENEWED JULY 12, 1915.

1,215,532.

Patented Feb. 13, 1917.
5 SHEETS—SHEET 1.

WITNESSES:

INVENTORS
William F. Hitchcock
William D. Hawley
BY
Arthur E. Parsons
ATTORNEY

W. F. HITCHCOCK & W. D. HAWLEY.
TIME RECORDER.
APPLICATION FILED OCT. 21, 1907. RENEWED JULY 12, 1915.

1,215,532.

Patented Feb. 13, 1917.
5 SHEETS—SHEET 2.

W. F. HITCHCOCK & W. D. HAWLEY.
TIME RECORDER.
APPLICATION FILED OCT. 21, 1907. RENEWED JULY 12, 1915.

1,215,532.
Patented Feb. 13, 1917.
5 SHEETS—SHEET 3.

WITNESSES:
Chas. H. Young
S. Davis

INVENTORS
William F. Hitchcock
William D. Hawley
BY
Arthur E. Parsons
ATTORNEY

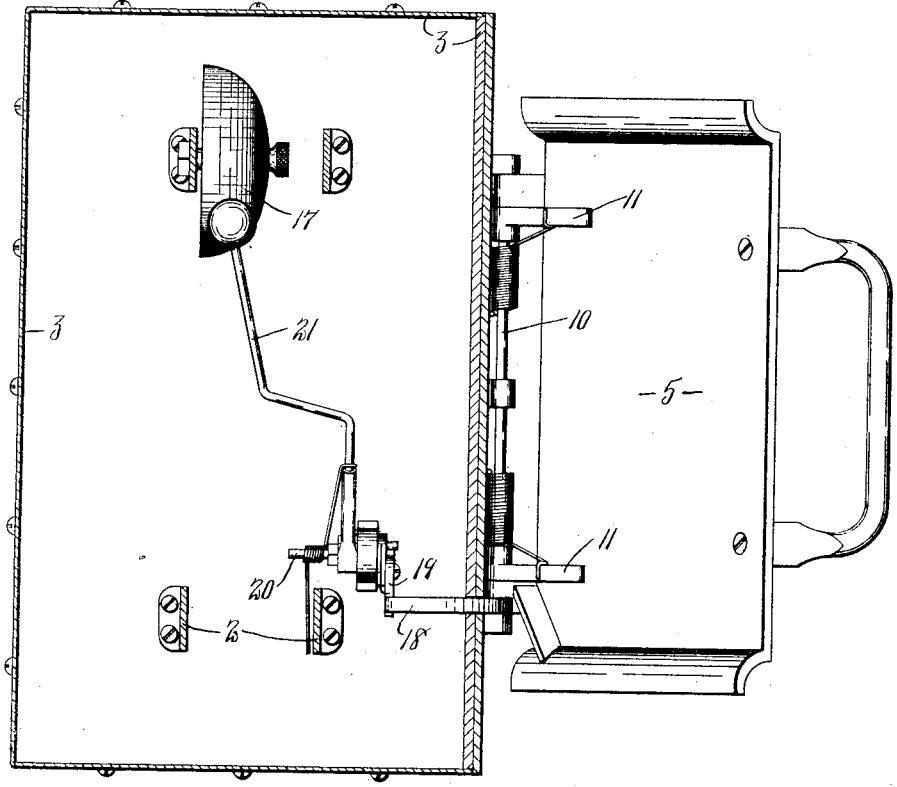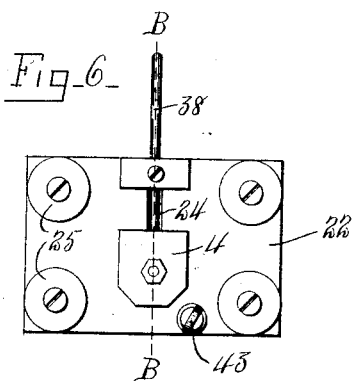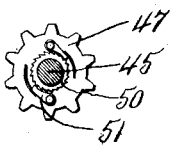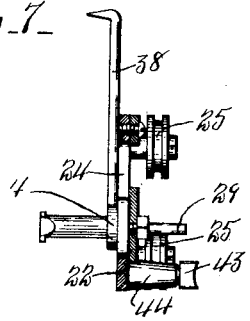

W. F. HITCHCOCK & W. D. HAWLEY.
TIME RECORDER.
APPLICATION FILED OCT. 21, 1907. RENEWED JULY 12, 1915.
1,215,532.
Patented Feb. 13, 1917.
5 SHEETS—SHEET 5.
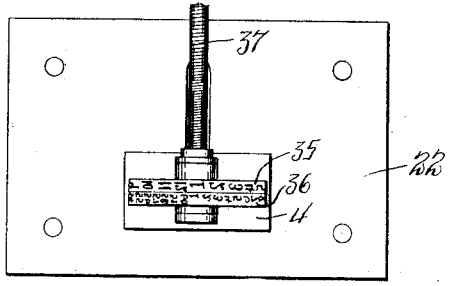
Fig. 9.
Fig. 10.
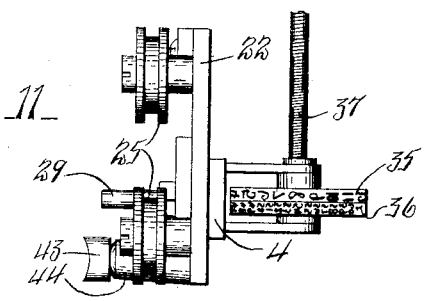
Fig. 11.
WITNESSES:
Chas. H. Young
S. Davis
INVENTOR
William F. Hitchcock
William D. Hawley
BY
Arthur E. Parsons
ATTORNEY

UNITED STATES PATENT OFFICE.

WILLIAM F. HITCHCOCK, OF ROCHESTER, AND WILLIAM D. HAWLEY, OF SYRACUSE, NEW YORK.

TIME-RECORDER.

1,215,532.  Specification of Letters Patent.  Patented Feb. 13, 1917.

Application filed October 21, 1907, Serial No. 398,341. Renewed July 12, 1915. Serial No. 39,520.

*To all whom it may concern:*

Be it known that we, WILLIAM F. HITCHCOCK, of Rochester, in the county of Monroe and State of New York, and WILLIAM D. HAWLEY, of Syracuse, in the county of Onondaga and State of New York, have invented a certain new and useful Time-Recorder, of which the following is a specification.
Our invention has for its object the production of a time-recorder, which is particularly simple in construction and highly efficient in use; and to this end, it consists in the combinations and constructions hereinafter set forth and claimed.

In describing this invention, reference is had to the accompanying drawing, in which like characters designate corresponding parts in all the views.
Figure 1 is a front elevation of one form of our invention.

Fig. 5 is a sectional view, partly in elevation, on line A—A, Fig. 2.
Fig. 6 is a rear elevation of the carriage for the marker.

Fig. 7 is a sectional view, partly in elevation, on line B—B, Fig. 6.

Fig. 8 is a sectional view on line C—C, Fig. 4.

Fig. 9 illustrates one form of record-sheet or card used in this time-recorder.

Figs. 10 and 11 are, respectively, front and end elevations of another form of the traveling marker and the carriage therefor.

Figure 1:
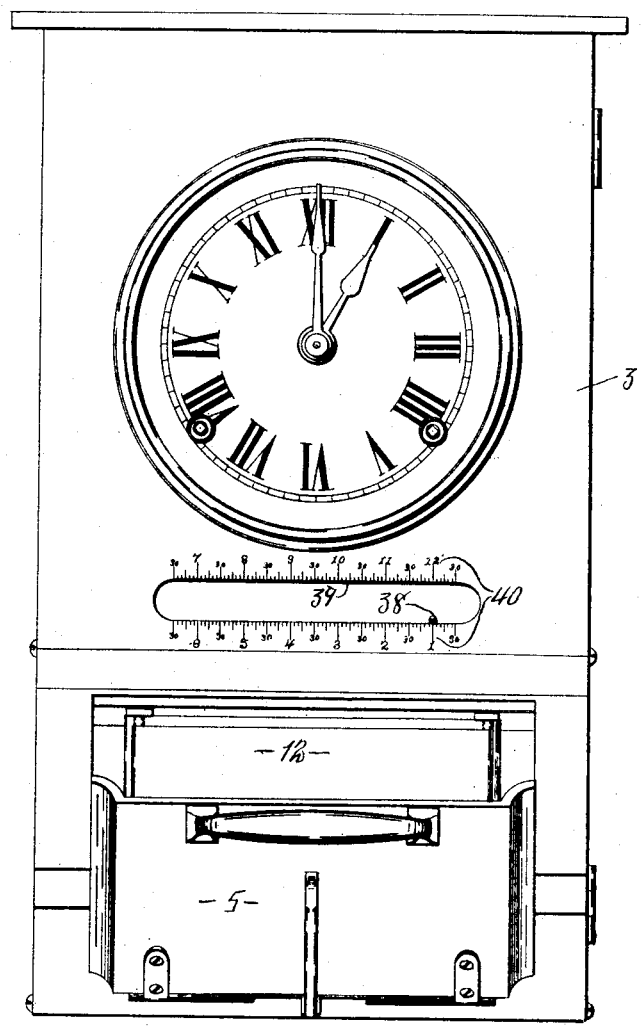
Figure 2:
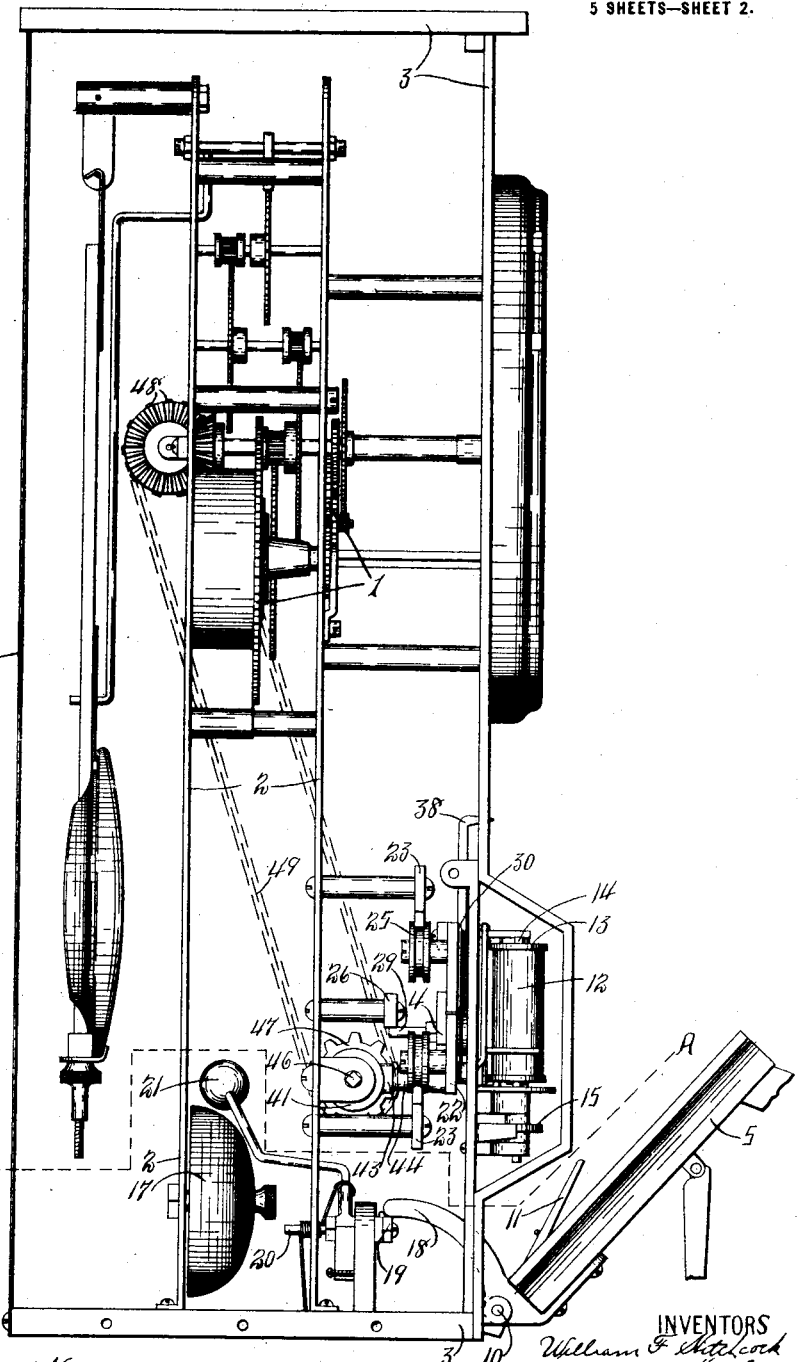
Fig. 2 is a side elevation, partly broken away, thereof.

This time-recorder comprises, generally, a time-movement, two elements, one a holder for a record-sheet, and the other a printing element or marker, one of said elements moving relatively to the other in opposite directions, and time-controlled mechanism for automatically actuating the relatively-movable element in opposite directions.

As here illustrated, the relatively-movable element travels synchronously with the operation of the time-movement in a continuous path, portions of which extend in opposite directions and constitute courses corresponding to divisions of a workday, as a. m. and p. m., and other portions of which extend at an angle to said courses for permitting the traveling element to shift from one course to the other at predetermined parts of its path of movement. Consequently, the traveling element is automatically positioned relatively to the other element so that the time-designations are located at the correct places on the record sheet and cannot be placed at any desired place on the record-sheet or card, and the time-designations for each workday are arranged on the record-sheet or card in two rows side by side reading in opposite directions, the positions of the time-designations being governed solely by the time-movement.

The time-movement 1 may be of any desirable form, size, and construction, and is supported by a suitable frame 2 which is inclosed within a case 3. As illustrated, the printing element or marker 4 travels back and forth crosswise of the holder 5 for the card 6; and the card-holder 5 is movable toward and from the marker in order to effect the making of a record upon the card, said marker traveling, Fig. 4, in one direction in one course, as indicated by the arrow 7, and in the opposite direction in the other course, as indicated by the arrow 8, and to its starting point, it being preferably movable in a direction crosswise of said courses from either course to the other when it reaches the end of either course, as indicated by the arrows 9.

The card-holder is here shown as a platen pivoted at 10 to the case 3, and movable on its pivot 10 to carry the card toward the marker. The card 6 is held from movement in the holder, during the making of a record, by spring-pressed arms 11 mounted on the hinge-pin or pivot 10 of the card-holder, and extended between the holder and the marker, said arms being normally spaced apart from the card-engaging face of the holder, in order to permit the card 6 to be inserted in the holder, and remaining stationary until they are encountered and carried by the holder in its movement toward the marker. An inking ribbon 12 extends across the marker, and as here shown, said ribbon is carried on spools 13, mounted on spindles 14 having ratchet-wheels 15 with which pawls 16 coact. The spools are adapted to be clutched alternately to the respective spindles by any suitable means not necessary to describe. Said pawls extend into the path of the card-holder, so that as said holder approaches the limit of its movement toward the marker, it engages and oscillates the pawls 16 and thereby turns the ratchet-wheels 15; the direction of movement of the ribbon depending on which of the spools is clutched to its spindle.

Our time-recorder is provided with a bell 17 which is rung by the card-holder, upon the making of each record, through the medium of an arm 18 carried by said holder, a pawl 19 mounted on a rock-shaft 20 and arranged in the path of said arm, and a spring-pressed hammer 21 mounted on the rock-shaft. The pawl 19 is so connected to the rock-shaft that it transmits motion to said shaft only during the forward movement of the card-holder, and thereby raises the hammer until the arm 18 slips from engagement with the pawl 19 and permits the hammer to strike under the influence of its spring; and said pawl yields during the retrograde movement of said arm for permitting the arm to return to its normal position without transmitting motion to the rock-shaft.

Figure 3:
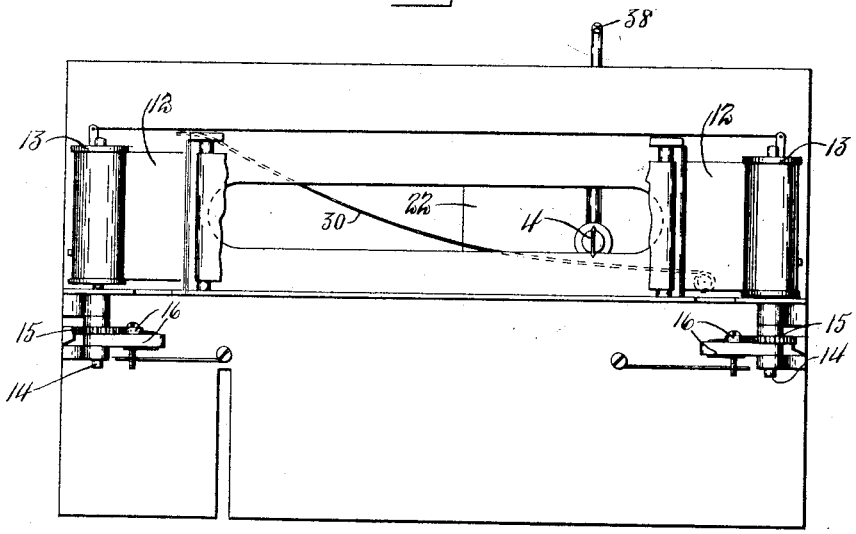
Figs. 3 and 4 are, respectively, front and rear elevations of the mechanism for actuating the traveling marker, and contiguous parts, Fig. 3 being partly broken away.

As seen in Figs. 2, 4, 6 and 7, the traveling marker 4 is supported by a carriage 22 movable reciprocally along tracks 23 supported by the frame 2, the carriage being formed with a guide 24 extending at an angle to the direction of movement of the carriage, and the marker being reciprocally movable in the guide 24. The tracks 23 are preferably horizontal, and the guide 24 of the carriage is vertical. Said carriage 22 is preferably provided with rollers 25 which engage the tracks 23; and the marker is held in its courses and is prevented from movement in its guide when the carriage is between its extreme positions, by a guide consisting of a bar 26 arranged parallel to the tracks 23 and having engaging surfaces 27, 28 on opposite sides thereof, with which slidably engages, a part or arm 29 provided on the marker, said arm engaging the upper surface 27 when the carriage is moved in one direction, and the lower surface 28 when the carriage is moved in the opposite direction. The guide or bar 26 terminates short of the ends of the tracks 23 in order that the marker may move from one end of the guide 24 of the carriage to the other end, and to thereby shift from one course to the other when the carriage reaches the end of its movement in either direction. The marker is movable by gravity from the upper course to the lower course, and it is moved by a spring 30 upwardly in the guide 24 from the lower course to the upper, said spring being depressed or tensioned by the marker during the movement of the carriage along the track to the left, Fig. 3. The starting of the carriage in the opposite direction, when it reaches the end of its movement in either direction, may be facilitated by springs 31 arranged in the path of said carriage.

The card 6 is usually divided into rows of columns 32, 33 which are subdivided into periods of time as hours, and fractions of hours, and such subdivisions are denominated by figures extending along the rows and reading in opposite directions; and the marker preferably prints an arrow 34, or other designation, opposite or nearly opposite the figures, the position of the arrow being determined by the time-movement. The card illustrated in Fig. 9, informs the time-keeper that the workman entered the factory at 7 a. m. and left for the noon recess between 12 and 12:15, and that he returned between 12:45 and 1 p. m., and left shortly after 6 p. m. Obviously, a plain card may be used and the marker 4 provided with type-wheels 35, 36, Figs. 10 and 11, actuated by the time-movement through a flexible shaft 37.

An indicator 38 which is movable with the carriage, extends through a slot 39 in the casing, and the outer end thereof moves along a chart comprising rows 40 arranged along opposite sides of the slot 39 and subdivided similarly to the columns of the card.

Figure 4:
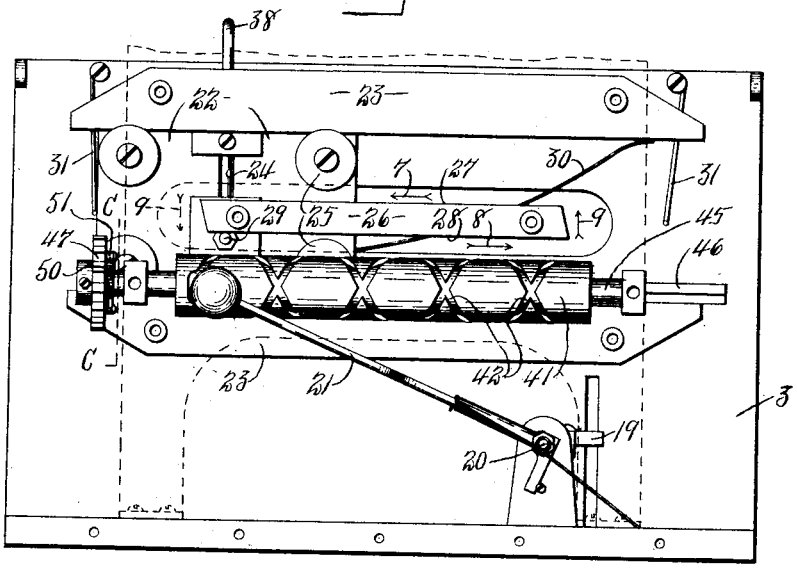

As best seen in Fig. 4 the time-controlled mechanism for reciprocating the carriage comprises a revolving part as a cylinder 41 having spiral ways or grooves 42 progressing in opposite directions, the ways or grooves intersecting and the ends thereof communicating, said grooves receiving a part as a pivoted block 43 provided on the end of the arm 44 rigid with the carriage, so that, as the cylinder rotates, the block reciprocates lengthwise of the cylinder. Said cylinder is mounted on a shaft 45 having a squared end 46 for receiving a key, by means of which the cylinder may be rotated by hand, and is connected to the time-movement by suitable power-transmitting means, here shown as sprocket-wheels 47 48 associated, respectively, with the cylinder and time-movement, and a chain 49 running over the sprocket-wheels. The sprocket-wheel 47 is connected to the shaft 45 by a suitable clutch, as a ratchet-wheel 50 and pawl 51, Fig. 8, for permitting the cylinder to be adjusted by hand relatively to the time-movement.

Our time-recorder is particularly advantageous in that it is entirely automatic in its action and no fraud or mistake detecting devices are necessary.

What we claim is:—

1. In a workman's time-recorder, two elements, a carriage for one of the elements, the carriage having a cycle of movement relatively to the other element, and said element supported by the carriage being movable with the carriage during its cycle of movement, and having a cycle of movement relatively to the carriage, and the other element, and time-operated mechanism for automatically controlling the movement of said carriage and the element supported thereby, substantially as and for the purpose described.

2. In a workman's time-recorder, a card holder, a marker, a carriage for the marker, the carriage being movable relatively to the card holder, and the marker being movable with the carriage and also independently of the carriage relatively to the card holder, and time-operated mechanism for automatically controlling the movement of the carriage and the marker, substantially as and for the purpose specified.

3. In a workman's time-recorder, a card holder, a carriage movable in reverse directions relatively to the holder, a marker supported by the carriage and movable therewith and also movable independently of said carriage, and time-operated mechanism for controlling the movement of the carriage and the marker, substantially as and for the purpose set forth.

4. In a workman's time-recorder, a card holder, a carriage movable in reverse directions relatively to the holder, a marker supported by the carriage and movable therewith and also movable independently of the carriage in a direction at an angle to the path of movement of the carriage, and time operated mechanism for controlling the movement of the carriage and the marker, substantially as and for the purpose described.

5. In a workman's time recorder, two elements, one a card holder and the other a marker, the marker being movable relatively to the holder in opposite directions and in different substantially straight paths, and time-controlled mechanism for automatically moving the marker as aforesaid, substantially as and for the purpose described.

6. In a workman's time recorder, two elements, one a card holder and the other a marker, the marker being movable relatively to the holder in a continuous path, having straight portions located in different positions, such portions being connected, whereby the marker automatically transfers from either straight portion to the other and repeats its movement continuously over such path, and time-controlled mechanism for automatically moving the marker, substantially as and for the purpose specified.

7. In a workman's time recorder, two elements, one a card holder and the other a marker, one of said elements being movable relatively to the other in a continuous path, portions of the path being straight and extending in opposite directions, such portions being connected at their opposite ends, whereby the relatively movable element can transfer from either portion of the path to the other automatically and repeat its course in the path automatically, and time-controlled mechanism for automatically effecting said movement of the relatively movable element at a uniform speed, substantially as and for the purpose set forth.

8. In a workman's time-recorder, two elements, one a card-holder and the other a marker, one of said elements traveling as one body relatively to the other, the traveling element being movable in a plurality of courses extending side by side, each course corresponding to a division of a workday, and said traveling element being movable in opposite directions in the courses, whereby the records for a workday are arranged on the card in two rows corresponding to divisions of a workday and reading in opposite directions, a time-movement, and mechanism controlled by the time-movement for advancing the traveling element in its courses synchronously with the operation of the time-movement, whereby the traveling element is automatically positioned relatively to the other element, so that the positions of the records on the card are governed solely by the time-movement, substantially as and for the purpose set forth.

9. In a workman's time-recorder, two elements, one a card-holder and the other a marker, one of said elements traveling as one body relatively to the other in two courses extending side by side, the traveling element being movable in one direction in one course and in the opposite direction in the other course, whereby the records are arranged on the card in rows representing divisions of a workday and reading in opposite directions, a time-movement, and mechanism controlled by the time-movement for advancing the traveling element in its courses synchronously with the operation of the time-movement, whereby the traveling element is automatically positioned relatively to the other element, so that the positions of the records in the rows on the card are governed solely by the time-movement, substantially as and for the purpose specified.

10. In a workman's time-recorder, two elements, one a card-holder and the other a marker, one of said elements traveling as one body relatively to the other in courses extending in opposite directions, the traveling element being movable in one direction in one course and in the opposite direction in the other course and to its starting point, a time-movement, and mechanism controlled by the time-movement for advancing the traveling element in its courses synchronously with the operation of the time-movement, whereby the traveling element is automatically positioned relatively to the other element, so that the positions of the records on the card are governed solely by the time-movement, substantially as and for the purpose set forth.

11. In a workman's time-recorder, two elements, one a card-holder and the other a marker, one of said elements traveling as one body relatively to the other in two courses extending side by side, whereby the records are arranged on the card in two rows representing divisions of a workday, the traveling element being also movable in a direction crosswise of said courses from one course to the other when it reaches the end of either course, means for guiding the traveling element in said movements, a time-movement, and mechanism controlled by the time-movement for advancing the traveling element in said courses at a uniform speed synchronously with the operation of the time-movement, whereby the traveling element is automatically positioned relatively to the other element, so that the positions of the records on the card are governed solely by the time-movement, substantially as and for the purpose described.

12. In a workman's time-recorder, a card-holder, a traveling marker movable as one body relatively to the card-holder in a plurality of courses extending side by side, each course corresponding to a division of a workday, the marker being movable in opposite directions in said courses, whereby the records for a workday are arranged on the card in two rows corresponding to divisions of a workday and reading in opposite directions, a time-movement, and mechanism controlled by the time-movement for advancing the marker in its courses synchronously with the operation of the time-movement, whereby the marker is automatically positioned relatively to the card-holder, so that the positions of the records on the card are governed solely by the time-movement, substantially as and for the purpose specified.

13. In a workman's time-recorder, a card-holder, a traveling marker movable as one body relatively to the card-holder in two courses extending side by side, the marker being movable in one direction in one course and in the opposite direction in the other course, whereby the records are arranged on the card in rows representing divisions of a workday and reading in opposite directions, a time-movement, and mechanism controlled by the time-movement for advancing the marker in its courses synchronously with the operation of the time-movement, whereby the marker is automatically positioned relatively to the card-holder, so that the positions of the records on the card are governed solely by the time-movement, substantially as and for the purpose set forth.

14. In a workman's time-recorder, a card-holder, a traveling marker movable as one body relatively to the card-holder in courses extending in opposite directions, the marker being movable in one direction in one course and in the opposite direction in the other course and to its starting point, a time-movement, and mechanism controlled by the time-movement for advancing the marker in its courses synchronously with the operation of the time-movement, whereby the marker is automatically positioned relatively to the card-holder, so that the positions of the records on the card are governed solely by the time-movement, substantially as and for the purpose specified.

15. In a workman's time-recorder, a card-holder, a traveling marker movable as one body relatively to the card-holder in two courses extending side by side, whereby the records are arranged on the record-sheet in two rows representing divisions of a workday, said marker being also movable from one course to the other when it reaches the end of either course, means for guiding the traveling marker in said movements, a time-movement, and mechanism controlled by the time-movement for advancing the marker in said courses synchronously with the operation of the time-movement, whereby the marker is automatically positioned relatively to the card-holder, so that the positions of the records in the rows on the card are governed solely by the time-movement, substantially as and for the purpose described.

16. In a time-recorder, a card-holder, a carriage movable in opposite directions relatively to the holder, a marker supported by the carriage, said marker having a movement relatively to the carriage, and time-controlled mechanism for automatically moving the carriage in opposite directions, substantially as and for the purpose specified.

17. In a time-recorder, a card-holder, a carriage movable reciprocally relatively to the holder, and formed with a guide extending at an angle to the direction of movement of the carriage, a marker supported by the carriage and movable reciprocally in the guide, means for preventing the marker from movement in the guide when the carriage is between its extreme positions, and time-controlled mechanism for actuating the carriage at a substantially uniform speed, substantially as and for the purpose described.

18. In a time-recorder, a card-holder, a carriage movable in opposite directions relatively to the holder, a marker supported by the carriage, said marker having a movement relatively to the carriage, means for holding the marker from movement relatively to the carriage during a portion of the travel of the carriage, and for permitting the movement of the marker relatively to the carriage at a predetermined part of the travel of said carriage, and time-controlled mechanism for automatically effecting the movement of the carriage, substantially as and for the purpose set forth.

19. In a time-recorder, a frame, a card-holder, a track supported by the frame, a guide extending parallel to the track and terminating short of the ends of said track, and having opposite engaging surfaces, a carriage movable along the track and formed with a guide extending in a direction crosswise of the track and of the first-mentioned guide, a marker supported by the carriage and movable reciprocally in the guide of the carriage, the marker being provided with a part for slidably engaging successively, said opposite surfaces of the first-mentioned guide, such part engaging one of said surfaces when the marker is at one end of the guide of the carriage, and engaging the other of said surfaces when the marker is at the opposite end of the guide of the carriage, and the marker being movable in the guide of the carriage when said engaging part has been moved by the carriage beyond the ends of the first-mentioned guide and is disengaged from said opposite surfaces, and time-controlled mechanism for actuating the carriage, substantially as and for the purpose described.

20. In a time-recorder, a card-holder, a carriage movable reciprocally relatively to the holder, and formed with a guide extending at an angle to the direction of movement of the carriage, a marker supported by the carriage and movable reciprocally in the guide, means for preventing the marker from movement in the guide when the carriage is between its extreme positions, and time-controlled mechanism for actuating the carriage at a substantially uniform speed, such mechanism including a cylindrical cam having spiral grooves intersecting each other and progressing in opposite directions and communicating at their ends, and a part movable in the grooves and connected to the carriage, substantially as and for the purpose specified.

21. In a time-recorder, a card-holder, a carriage movable in opposite directions relatively to the holder, a marker supported by the carriage, said marker having a movement relatively to the carriage, means for holding the marker from movement relatively to the carriage during a portion of the travel of the carriage, and for permitting the movement of the marker relatively to the carriage at a predetermined part of the travel of the carriage, and time-controlled mechanism for automatically effecting said movement of the carriage, such mechanism including a part provided with spiral ways progressing in opposite directions, and means connected to the carriage and movable along said ways, substantially as and for the purpose described.

22. In a time-recorder, a frame, a card-holder, a track supported by the frame, a guide extending parallel to the track and terminating short of the ends of said track, and having opposite engaging surfaces, a carriage movable along the track and formed with a guide extending in a direction crosswise of the track and the first-mentioned guide, a marker supported by the carriage and movable reciprocally in the guide of the carriage, the marker being provided with a part for slidably engaging, successively, said opposite surfaces of the first-mentioned guide, such part engaging one of said surfaces when the marker is at one end of the guide of the carriage, and engaging the other of said surfaces when the marker is at the opposite end of the guide of the carriage, and the marker being movable in the guide of the carriage when said engaging part has moved beyond the ends of the first-mentioned guide and is disengaged from said opposite surfaces, and time-controlled mechanism for actuating the carriage, such mechanism including a cylindrical cam having spiral grooves progressing in opposite directions and communicating at their ends, and a part movable in the grooves and connected to the carriage, substantially as and for the purpose set forth.

23. In a time-recorder, a card-holder, a traveling marker movable as one body in one direction in one course, and in the opposite direction in another course, said marker comprising movable type-wheels, and time-controlled mechanism for actuating the traveling marker in its courses, substantially as and for the purpose set forth.

24. In a time-recorder, a card-holder, a carriage movable reciprocally relatively to the holder, and formed with a guide extending at an angle to the direction of movement of the carriage, a marker supported by the carriage and movable reciprocally in the guide, said marker comprising movable type-wheels, means for preventing the marker from movement in the guide when the carriage is between its extreme positions, and time-controlled mechanism for reciprocating the carriage at a uniform speed, substantially as and for the purpose specified.

In testimony whereof, we have hereunto signed our names in the presence of two attesting witnesses.

Signed at Rochester, in the county of Monroe, and State of New York, this 17th day of Sept., 1907.

WILLIAM F. HITCHCOCK.

Witnesses:
 JAMES COCHRANE,
 M. M. TAIT.

Signed at Syracuse, in the county of Onondaga, and State of New York, this 27th day of August, 1907.

WILLIAM D. HAWLEY.

Witnesses:
 S. DAVIS,
 F. G. BODELL.

Copies of this patent may be obtained for five cents each, by addressing the "Commissioner of Patents, Washington, D. C."